Dec. 30, 1958  J. F. RINGELMAN  2,866,943
CIRCUIT FOR PROVIDING IMPROVED CORE CHARACTERISTICS
FOR SATURABLE REACTOR DEVICES
Filed Jan. 12, 1956

INVENTOR
JOHN F. RINGELMAN
BY
ATTORNEYS 2,866,943

CIRCUIT FOR PROVIDING IMPROVED CORE CHARACTERISTICS FOR SATURABLE REACTOR DEVICES

John F. Ringelman, Catonsville, Md., assignor, by mesne assignments, to the United States of America as represented by the Secretary of the Navy Application January 12, 1956, Serial No. 558,816

5 Claims. (Cl. 321—25)

The present invention relates to a circuit for providing improved core characteristics for saturable reactor devices.

In circuit applications in which a D. C. load current is obtained from an A. C. source, it is often desirable to have the load current insensitive to changes in A. C. supply voltage and/or frequency. The theory for and a mathematical analysis of a saturable reactor circuit which provides an approximately constant D. C. load current from an A. C. source are presented by H. F. Storm in an article entitled: "Series-Connected Saturable Reactor with Control Source of Comparatively High Impedance," AIEE Transactions, vol. 69, 1950. It is stated that for optimum operation the hysteresis loop for the saturable reactor core should be rectangular in shape and calculations are given based on the assumption that the saturable reactor core in the current reference device is constructed of ideal material having such a hysteresis loop. Of course if such material were obtainable it would find far wider use than only in the saturable reactor of the current reference device. The present invention relates to a circuit which makes optimum use of the critical non-saturating portion of the hysteresis loop for a saturable core of any material and also relates to the use of this circuit in the above-mentioned saturable reactor circuit.

Accordingly, an object of the present invention is the provision of a circuit which makes optimum use of the hysteresis characteristics of core materials utilized in saturable reactor devices.

Another object is to provide a circuit which makes optimum use of the non-saturable portion of the hysteresis characteristics of all core materials utilized in saturable reactor devices.

A further object of the invention is the provision of a saturable reactor current reference that will convert current from an A. C. supply into a D. C. current that is insensitive to changes in A. C. supply voltage and/or frequency.

Other objects and many of the attendant advantages of this invention will be readily appreciated as the same becomes better understood by reference to the following detailed description when considered in connection with the accompanying drawings wherein.

Figures 1, 2, 3, 4:
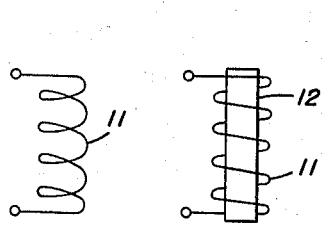
Fig. 1 shows a diagram of an air core coil.
Fig. 2 illustrates a diagram of a coil with a high permeability open-ended core.
Fig. 3 shows a diagram of a coil with a high permeability gapless core.
Fig. 4 is a graph of the relative slopes of the hysteresis loops of the coils of Figs. 1, 2 and 3.

Referring now to the drawings wherein like reference characters designate like or corresponding parts throughout the several figures, there is shown in Fig. 1 a coil 11 which has only an air core. In Figs. 2 and 3, coil 11 is illustrated with a high permeability open-ended core and a high permeability gapless core, respectively. The curves numbered 16, 17, and 18 of Fig. 4 indicate the relative reactance of the three inductors of Figs. 1, 2 and 3, respectively. Fig. 4 does not give an accurate relation of the slopes, but does illustrate the marked difference in slopes.

Figure 5:
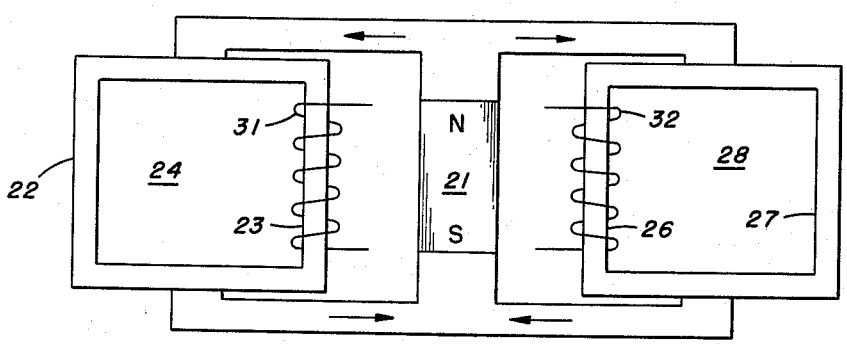
Fig. 5 is a side view of a preferred core utilizable in a current reference device.

In Fig. 5, a preferred saturable reactor core is shown in which flux from a permanent magnet 21 is supplied to legs 22 and 23 of core 24 and to legs 26 and 27 of another core 28. D. C. windings could be employed instead of a permanent magnet, but as explained in the Storm article there are certain advantages to the use of a permanent magnet. Windings 31 and 32 are load windings and hereinafter the legs upon which these load windings are wound will be referred to as load legs.

Figure 6:
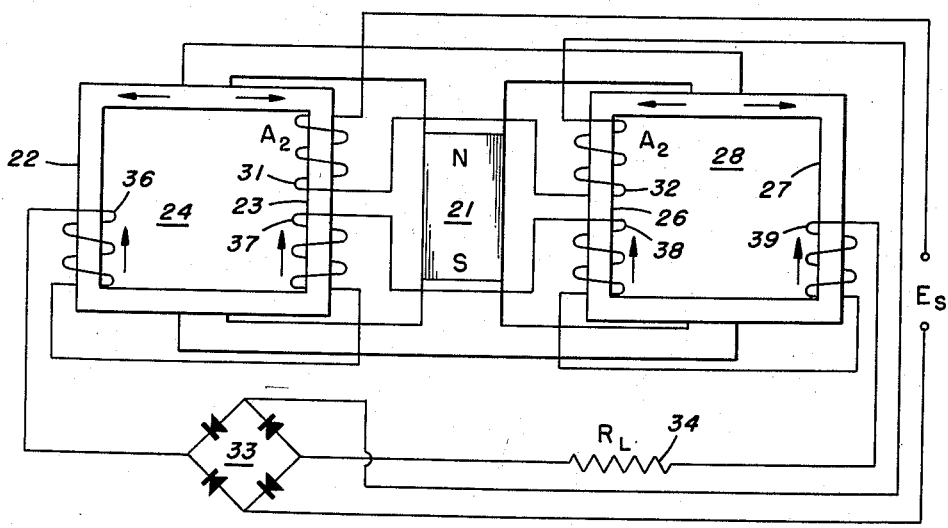
Fig. 6 is a circuit diagram of a preferred embodiment of the invention.

In the preferred current reference embodiment shown in Fig. 6, an A. C. voltage Es from a source (not shown) produces an A. C. current flow through load windings 31 and 32 and by means of full-wave rectifier 33 causes a D. C. current to flow through load 34, desaturating windings 36 and 39, and compensating windings 37 and 38. The arrows in Fig. 6 and also Fig. 5 indicate the direction of flux flow, and in particular the arrows adjacent windings 36, 37, 38 and 39 show the direction of flux flow in the core legs as a result of the direct current through these windings.

A reading of the mentioned AIEE article makes the proposition evident that for an accurate reference the core of the saturable reactor must be such that very low inductance is presented to the supply voltage when the core is saturated and very high inductance when the core is unsaturated. The first requirement can easily be made as good as the core material will permit; however, the second requirement is more difficult to obtain. It is apparent from Fig. 4 that the highest unsaturated inductance is obtained from a gapless path of high permeability magnetic material (Fig. 3), thus the saturable reactor core for this current reference device should be gapless. For best operation the permanent magnet 21 must supply flux which is much more than that sufficient to saturate all four legs, which means that when the load legs are desaturated by the current through the load windings, the non-load legs remain saturated as a result of the flux from magnet 21 and thus do not provide a low reluctance path for the flux from the load windings. In essence then, each core becomes open-ended (Fig. 2) and has relatively low unsaturated inductance as is indicated by curve 17 of Fig. 4. It is evident that if gapless cores are to be obtained, legs 22 and 27 must be unsaturated.

One possible solution to this saturation problem is to increase the lengths of legs 22 and 27 and thus their reluctance until permanent magnet 21 does not have sufficient magnetomotive force to saturate these legs. The principal disadvantage to this solution is that the lengthened legs 22 and 27 are also a high reluctance path for the flux generated by the load windings. Fig. 6 illustrates a solution that does not have this disadvantage. The D. C. load current through winding 36 cancels the saturating effect that permanent magnet 21 has upon leg 22, and winding 37 cancels the positive feedback effect that winding 36 has on the flux level of leg 23. This same analysis also holds true for legs 26 and 27 of core 28. Therefore, gapless core conditions are obtained even though one leg (the load leg) of each core is saturated during portions of the operation cycle.

A circuit has been disclosed which improves the hysteresis characteristics of a multileg gapless core which has a leg that is at some times operated in a saturated condition. A specific application of this circuit has been shown in a current reference device which produces a constant D. C. current from an A. C. source. An explanation of the operation of the current reference device has not been presented inasmuch as it is not necessary for an understanding of the operation of the present invention, and furthermore this explanation is obtainable from the mentioned AIEE article.

Obviously many modifications and variations of the present invention are possible in the light of the above teachings. It is therefore to be understood that within the scop of the appended claims the invention may be practiced otherwise than as specifically described.

What is claimed is:

1. A saturable reactor current reference comprising: a saturable reactor magnetic circuit comprising two gapless cores each of which has two legs, a continuous unidirectional flux generator having much more magnetomotive force than necessary to saturate all legs of said two gapless cores when connected to said cores by low reluctance material, and low reluctance material connecting said continuous unidirectional flux generator in parallel with said gapless cores; alternating current terminals for connection to a source of alternating current electrical energy; two load windings, one of which is wound upon one leg of one of said cores with one winding sense and the other of which is wound upon a leg of the other of said cores in opposite winding sense to said one winding sense; a full-wave rectifier having input terminals and output terminals; circuit means connecting said input terminals and said load windings in series to said alternating current terminals; four windings, each of which is wound upon a different leg of said cores; a pair of load terminals; circuit means connecting said four windings and said load terminals in series to said output terminals; said four windings each having a winding sense to generate flux in opposition to the flux of said continuous unidirectional flux generator, the number of turns of said four windings being such that the normal direct load current through these windings will maintain the non-load legs in an unsaturated condition and will cancel the flux produced in the load legs by the windings on the non-load legs.

2. The saturable reactor current reference of claim 1 wherein said continuous unidirectional flux generator comprises a permanent magnet.

3. In a magnetic device in which there is a multileg gapless core, one leg of which is sometimes saturated during the operating cycle of the magnetic device, a circuit for improving the hysteresis characteristic of said gapless core, said circuit comprising: means for maintaining an unsaturated condition in a leg other than said one leg of said gapless core, and means for cancelling out the effects of said first-mentioned means in said one leg.

4. The circuit of claim 3 wherein the first-mentioned means comprises a winding wound upon said other leg and having terminals for connection to a source of direct current, and wherein the last-mentioned means comprises a winding wound upon said one leg and having terminals for connection to a source of direct current.

5. A saturable reactor current reference comprising: a saturable reactor magnetic circuit comprising at least two multileg gapless cores; means for providing a continuous unidirectional saturating flux to the legs of said gapless cores; a full wave rectifier; alternating current supply terminals; direct current load terminals; alternating current load windings, one wound upon one leg of each of said cores; leads for connecting said alternating current terminals to said alternating current load windings and said rectifier and for connecting said direct current load terminals to said rectifier whereby when an alternating voltage is applied to said alternating current terminals an alternating current flows through said alternating current windings and a direct voltage appears across said direct current load terminals; flux means responsive to the direct load current resulting from the direct voltage for maintaining at least one leg of each core, other than the leg carrying the alternating current load winding, in an unsaturated condition; and means responsive to the direct load current for cancelling out the effects of said flux means in the legs upon which alternating current load windings are wound.

References Cited in the file of this patent

UNITED STATES PATENTS

| | | |
|---|---|---|
| 2,140,349 | Dawson | Dec. 13, 1938 |
| 2,215,820 | Hines | Sept. 24, 1940 |
| 2,322,130 | Hedding | June 15, 1943 |
| 2,426,937 | Long | Sept. 2, 1947 |